US010978906B2

(12) United States Patent
Beaucage et al.

(10) Patent No.: US 10,978,906 B2
(45) Date of Patent: Apr. 13, 2021

(54) FOUR-WAY AUTOMATIC TRANSFER SWITCH POWER TOPOLOGY

(71) Applicant: Cummins Power Generation IP, Inc., Minneapolis, MN (US)

(72) Inventors: Timothy R. Beaucage, Coon Rapids, MN (US); Julie M. Delago, Afton, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 123 days.

(21) Appl. No.: 16/201,573

(22) Filed: Nov. 27, 2018

(65) Prior Publication Data

US 2020/0169113 A1 May 28, 2020

(51) Int. Cl.
  *H02J 9/06* (2006.01)
  *H01H 71/00* (2006.01)
  *H02H 7/28* (2006.01)
  *H01H 63/28* (2006.01)

(52) U.S. Cl.
  CPC .......... *H02J 9/061* (2013.01); *H01H 71/00* (2013.01); *H02H 7/28* (2013.01); *H01H 63/28* (2013.01); *H01H 2300/018* (2013.01); *H02J 9/068* (2020.01)

(58) Field of Classification Search
  CPC ..... H02J 9/00; H02J 9/06; G06F 11/00; G06F 11/13; G06F 11/32
  See application file for complete search history.

(56) References Cited

U.S. PATENT DOCUMENTS

| 8,138,625 | B2 | 3/2012 | Duan et al. |
| 8,686,594 | B2 * | 4/2014 | Morales ................. G06F 1/26 307/64 |
| 8,930,038 | B2 * | 1/2015 | Forbes, Jr. ............ G05B 13/02 700/295 |
| 9,081,568 | B1 * | 7/2015 | Ross ..................... G06F 1/263 |
| 10,211,669 | B1 * | 2/2019 | Wildstone ............... H01H 9/26 |

(Continued)

OTHER PUBLICATIONS

International Search Report and Written Opinion issued in International Patent Application No. PCT/US2019/063161 dated Feb. 5, 2020, fourteen (14) pages.

*Primary Examiner* — Jared Fureman
*Assistant Examiner* — Esayas G Yeshaw
(74) *Attorney, Agent, or Firm* — Foley & Lardner LLP

(57) ABSTRACT

Systems and apparatuses include a mesh network for power distribution. The mesh network includes a plurality of interconnected four-way automatic transfer switches. Each four-way automatic transfer switch includes a common pole, a first pole selectively coupled to the common pole with a first switching device, a second pole selectively coupled to the common pole with a second switching device, a third pole selectively coupled to the common pole with a third switching device, and a fourth pole selectively coupled to the common pole with a fourth switching device. The common pole of a first interconnected four-way automatic transfer switch of the plurality of interconnected four-way automatic transfer switches is structured to provide power to a corresponding load, and the common poles of two or more of the plurality of interconnected four-way automatic transfer switches are structured to receive power from corresponding power sources.

22 Claims, 2 Drawing Sheets

(56) References Cited

U.S. PATENT DOCUMENTS

| | | | |
|---|---|---|---|
| 2002/0135233 A1* | 9/2002 | Cratty | H02J 9/06 307/64 |
| 2011/0068625 A1 | 3/2011 | Duan et al. | |
| 2016/0195911 A1* | 7/2016 | Chapel | G06F 1/28 713/340 |
| 2016/0197517 A1* | 7/2016 | Bundschuh | H02J 3/381 307/64 |

* cited by examiner

FOUR-WAY AUTOMATIC TRANSFER SWITCH POWER TOPOLOGY

TECHNICAL FIELD

The present disclosure relates to power couplings. More particularly, the present disclosure relates to systems and methods for connecting a power source to multiple loads.

BACKGROUND

Automatic transfer switches (ATSs) for consumer applications may be used, for example, to selectively couple a local load from a residential or commercial building to a utility power grid. Such devices may also be used to selectively couple a local load to a generator when a power outage has occurred. A typical ATS has two power source inputs and an output. A typical ATS is composed of multiple parts such as an actuator, solenoids and contactor cartridges. ATS designs have complicated constructions and numerous parts, particularly with respect to the actuator and solenoid subsystems.

SUMMARY

One embodiment relates to an apparatus that includes a mesh network for power distribution. The mesh network includes a plurality of interconnected four-way automatic transfer switches. Each four-way automatic transfer switch includes a common pole, a first pole selectively coupled to the common pole with a first switching device, a second pole selectively coupled to the common pole with a second switching device, a third pole selectively coupled to the common pole with a third switching device, and a fourth pole selectively coupled to the common pole with a fourth switching device. The common pole of a first interconnected four-way automatic transfer switch of the plurality of interconnected four-way automatic transfer switches is structured to provide power to a corresponding load, and the common poles of two or more of the plurality of interconnected four-way automatic transfer switches are structured to receive power from corresponding power sources.

Another embodiment relates to a system that includes a system that includes a first four-way automatic transfer switch including a first common pole structured to be coupled to one of a load and a power source, a second four-way automatic transfer switch including a second common pole structured to be coupled to one of a load and a power source, the second common pole selectively coupled to the first common pole, a third four-way automatic transfer switch including a third common pole structured to be coupled to one of a load and a power source, the third common pole selectively coupled to the second common pole, a fourth four-way automatic transfer switch including a fourth common pole structured to be coupled to one of a load and a power source, the fourth common pole selectively coupled to the first common pole, a fifth four-way automatic transfer switch including a fifth common pole structured to be coupled to one of a load and a power source, the fifth common pole selectively coupled to the fourth common pole and the second common pole, and a sixth four-way automatic transfer switch including a first common pole structured to be coupled to one of a load and a power source, the sixth common pole selectively coupled to the fifth common pole and the third common pole.

Another embodiment relates to a method that includes a method of interconnecting a mesh network, including providing a plurality of automatic transfer switches, each automatic transfer switch including a common pole and a plurality of transfer poles selectively coupled to the common pole, coupling the transfer poles together to form the mesh network, and coupling each common pole to one of a power source or a load.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for four-way reverse flow automatic transfer switches and their integration into mesh networks. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for a four-way automatic transfer switch that includes four transfer poles and a common pole. Each of the transfer poles is connected to a power source (e.g., grid power, a generator set, an inverter receiving power from a DC source such as a wind turbine, etc.) and the common pole is coupled to a downstream load arranged to receive power from one or more of the power sources. Switching devices are structured to selectively couple and decouple the transfer poles to the common pole to selectively provide from only one of the power sources, more than one power source in parallel, all four power sources in parallel, or none of the power sources.

The four-way automatic transfer switch can be used as a small scale alternating current microgrid itself with four independent power sources coupled via the four-way automatic transfer switch to a single load. The four-way automatic transfer switch can also be used in a reverse flow configuration and can be integrated into a larger and unlimitedly scalable mesh network for microgrid redundancy. In this, a single power source or a single load is coupled to the common pole, and the four switching devices are connected to other four-way automatic transfer switches to form a mesh network. The mesh network allows individual loads and/or power sources to be coupled or decoupled from the mesh network without taking down the remaining portions of the microgrid. This allows for uninterrupted power service during maintenance or replacement operations, while allowing the serviced node or grid section to be electrically isolated or "tagged out", among other advantages.

Figure 1:
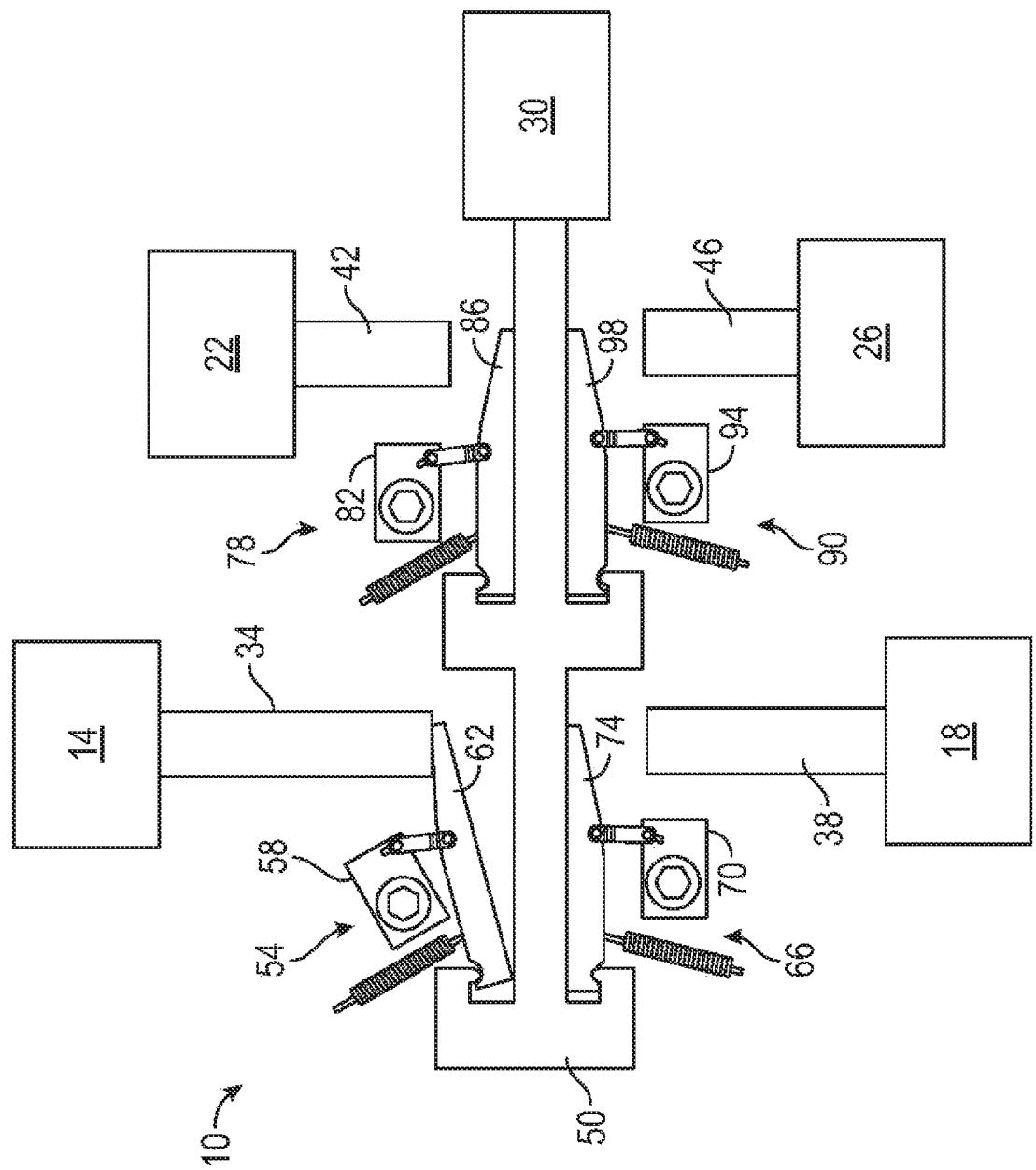
FIG. 1 is a schematic view of a four-way reverse flow automatic transfer switch according to some embodiments.

As shown in FIG. 1, a "blow-on" style automatic transfer switch (ATS) 10 is structured to interconnect a first power source 14, a second power source 18, a third power source 22, a fourth power source 26, and a load 30. The ATS 10 includes a first pole 34 structured to couple to the first power source 14, a second pole 38 structured to couple to the second power source 18, a third pole 42 structured to couple to the third power source 22, and a fourth pole 46 structured to couple to the fourth power source 26. In some embodiments, the ATS 10 is structured as a reverse flow automatic transfer switch and the first pole 34 is structured to couple to a first load, the second pole 38 is structured to couple to a second load, the third pole 42 is structured to couple to a third load, and the fourth pole 46 is structured to couple to a fourth load, with the common pole 50 coupled to a source. In some embodiments, the first through fourth poles 14-26 are considered transfer poles. It is noted that use of other four-way ATS switches having differing architectures other than the herein detailed "blow-on" style are possible and contemplated in embodiments of the present invention. It is further noted that the use of ATS switches with fewer or greater numbers of source connections than the detailed four-way switches (such as two, three, or more) in embodiments of the present invention are also possible, leading to differing mesh network topologies or for placement in network edge nodes where fewer connections are required.

The ATS 10 also includes a common pole 50 structured to couple to the load 30. A first switching device 54 includes a first actuator 58 structured to move a first contact 62 between a closed position (shown in FIG. 1) that electrically couples the first pole 34 and the common pole 50, and an open position that electrically isolates the first pole 34 from the common pole 50. In some embodiments, the first actuator 58 is controlled by a controller and includes an electric motor arranged to rotate, and a linkage coupled between the motor and the first contact 62. In some embodiments, the first contact 62 rotates relative to the common pole 50. In some embodiments, a spring or other biasing device maintains the first contact 62 in electrical connection with the common pole 50. In some embodiments, the first switching device 54 is structured to maintain a closed position and provide electrical communication between the first pole 34 and the common pole 50 continuously in both a power distribution and reverse flow arrangement.

A second switching device 66 includes a second actuator 70 structured to move a second contact 74 between a closed position that electrically couples the second pole 38 and the common pole 50, and an open position (Shown in FIG. 1) that electrically isolates the second pole 38 from the common pole 50. In some embodiments, the second actuator 70 is controlled by a controller and includes an electric motor arranged to rotate, and a linkage coupled between the motor and the second contact 74. In some embodiments, the second contact 74 rotates relative to the common pole 50. In some embodiments, a spring or other biasing device maintains the second contact 74 in electrical connection with the common pole 50. In some embodiments, the second switching device 66 is structured to maintain a closed position and provide electrical communication between the second pole 38 and the common pole 50 continuously in both a power distribution and reverse flow arrangement.

A third switching device 78 includes a third actuator 82 structured to move a third contact 86 between a closed position that electrically couples the third pole 42 and the common pole 50, and an open position (shown in FIG. 1) that electrically isolates the third pole 42 from the common pole 50. In some embodiments, the third actuator 82 is controlled by a controller and includes an electric motor arranged to rotate, and a linkage coupled between the motor and the third contact 86. In some embodiments, the third contact 86 rotates relative to the common pole 50. In some embodiments, a spring or other biasing device maintains the third contact 86 in electrical connection with the common pole 50. In some embodiments, the third switching device 78 is structured to maintain a closed position and provide electrical communication between the third pole 42 and the common pole 50 continuously in both a power distribution and reverse flow arrangement.

A fourth switching device 90 includes a fourth actuator 94 structured to move a fourth contact 98 between a closed position that electrically couples the fourth pole 46 and the common pole 50, and an open position (shown in FIG. 1) that electrically isolates the fourth pole 46 from the common pole 50. In some embodiments, the fourth actuator 94 is controlled by a controller and includes an electric motor arranged to rotate, and a linkage coupled between the motor and the fourth contact 98. In some embodiments, the fourth contact 98 rotates relative to the common pole 50. In some embodiments, a spring or other biasing device maintains the fourth contact 98 in electrical connection with the common pole 50. In some embodiments, the fourth switching device 90 is structured to maintain a closed position and provide electrical communication between the fourth pole 46 and the common pole 50 continuously in both a power distribution and reverse flow arrangement.

In some embodiments, the first through fourth switching devices 54, 66, 78, 90 are controlled by a controller and actuated between the open and closed positions to control the flow of electrical energy through the ATS 10. In some embodiments, the load 30 receives electrical energy from one or more of the first power source 14, the second power source 18, the third power source 22, and/or the fourth power source 26. In other embodiments, power is also transferred through the ATS 10 from one source connection to another source connection (14, 18, 22, 26) in addition to supplying the load 30. In some embodiments, the load 30 is replaced with a power source coupled to the common pole 50 and the power sources 14-26 are replaced with loads. The switching devices 54, 66, 78, 90 then dictate where electrical energy from the common pole 50 is directed. For example, all four or less than four of the switching devices 54, 66, 78, 90 could be arranged in the closed position to selectively power the poles 14-26.

Figure 2:
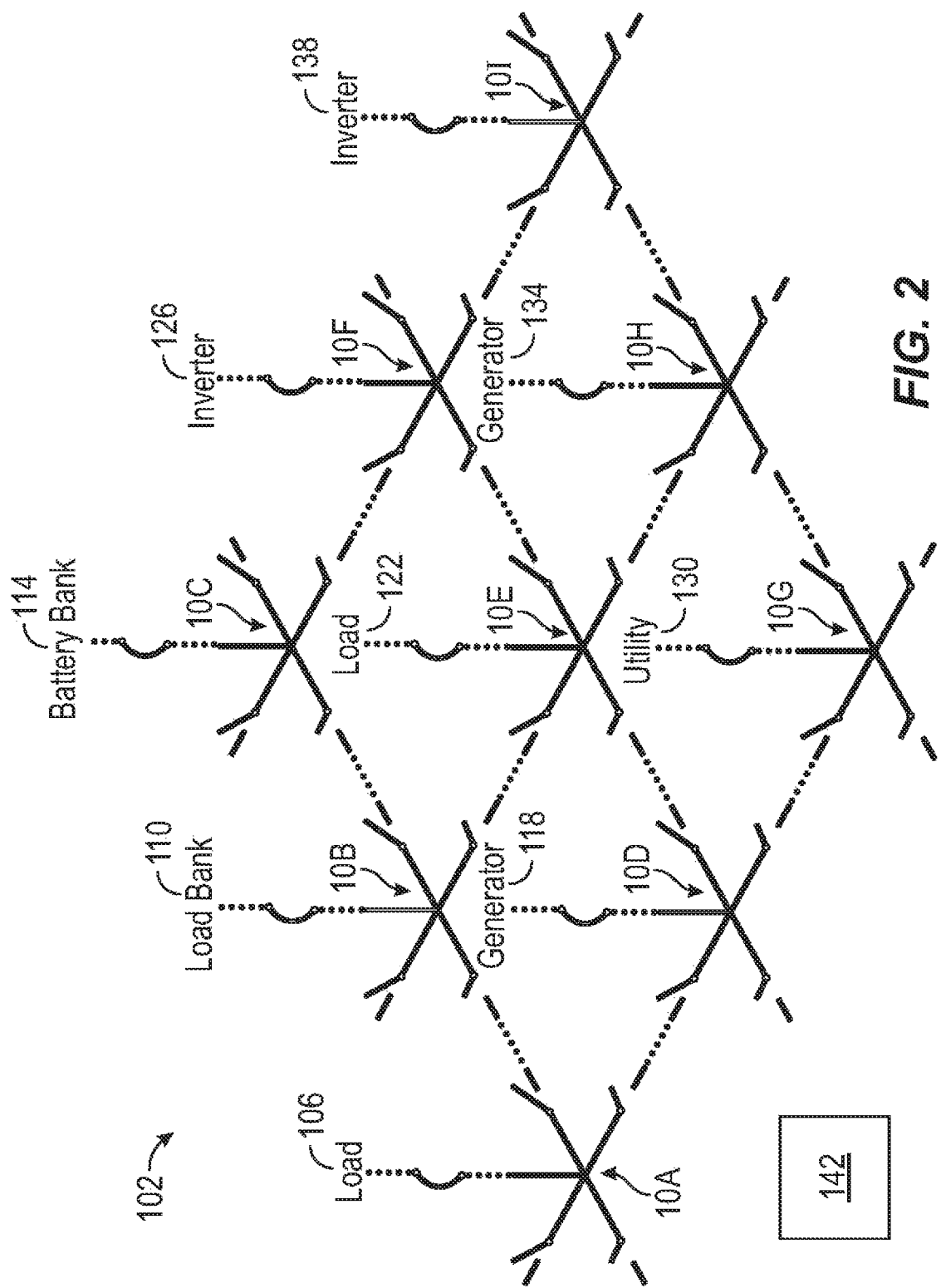
FIG. 2 is a schematic view of a mesh network including nine four-way reverse flow automatic transfer switches according to some embodiments.

As shown in FIG. 2, an exemplary mesh network 102 includes nine ATSs 10*a-i*. In the following descriptions, components of each ATS 10*a-i* will be identified with a corresponding letter identifying to clarify association of components with the ATS 10*a-i* with which they belong. The common pole 50*a* of a first ATS 10*a* is coupled to a first load 109 structured to receive and use power from the mesh network 102. In the illustrated example, the first pole 34*a* and the fourth pole 46*a* are open connections and not connected to other components. In some embodiments, the mesh network 102 is expanded and the first pole 34*a* and the fourth pole 46*a* are connected to other ATSs, other power sources, or other loads. It is noted that the common pole 50*a-i* in many embodiments can be coupled to the associated load or source (106-138) through a circuit breaker that can be used to isolate the source or load from the ATS node 10*a-i* under either a manual or automatic control.

The common pole 50*b* of a second ATS 10*b* is coupled to a load bank 110 which may be used for exercising generator sets or other components of the mesh network, or may be used to provide added load for other purposes. The first pole 34*b* of the second ATS 10*b* is open and not coupled to any system component, although in some embodiments, the first pole 34*b* of the second ATS 10*b* is coupled to the mesh network, or another component. The fourth pole 46*b* of the second ATS 10*b* is coupled to the second pole 38*a* of the first ATS 10a so that communication between the common pole 50a of the first ATS 10a and the common pole 50b of the second ATS 10b is controlled by the second switching device 66a of the first ATS 10a and the fourth switching device 90b of the second ATS 10b.

The common pole 50c of a third ATS 10c is coupled to a battery bank 114 structured to provide power into the mesh network 102. The first pole 34c and second pole 38c of the third ATS 10c is open and not coupled to any system component, although in some embodiments, the first pole 34c and/or second pole 38c of the third ATS 10c are coupled to the mesh network, or another component. The fourth pole 46c of the third ATS 10c is coupled to the second pole 38b of the second ATS 10b so that communication between the common pole 50b of the second ATS 10b and the common pole 50c of the third ATS 10c is controlled by the second switching device 66b of the second ATS 10b and the fourth switching device 90c of the third ATS 10c.

The common pole 50d of a fourth ATS 10d is coupled to a first generator set 118 structured to provide power into the mesh network 102. The fourth pole 46d of the fourth ATS 10d is open and not coupled to any system component, although in some embodiments, the fourth pole 46d of the fourth ATS 10d is coupled to the mesh network 102, or another component. The first pole 34d of the fourth ATS 10d is coupled to the third pole 42a of the first ATS 10a so that communication between the common pole 50a of the first ATS 10a and the common pole 50d of the fourth ATS 10d is controlled by the third switching device 78a of the first ATS 10a and the first switching device 54d of the fourth ATS 10d.

The common pole 50e of a fifth ATS 10e is coupled to a second load 122 structured to receive and use power from the mesh network 102. The first pole 34e of the fifth ATS 10e is coupled to the third pole 42b of the second ATS 10b so that communication between the common pole 50b of the second ATS 10b and the common pole 50 e of the fifth ATS 10e is controlled by the third switching device 78b of the second ATS 10b and the first switching device 54e of the fifth ATS 10e. The fourth pole 46e of the fifth ATS 10e is coupled to the second pole 38d of the fourth ATS 10d so that communication between the common pole 50d of the fourth ATS 10d and the common pole 50e of the fifth ATS 10e is controlled by the second switching device 66d of the fourth ATS 10d and the fourth switching device 90e of the fifth ATS 10e.

The common pole 50f of a sixth ATS 10f is coupled to a first inverter 126 structured to receive power from a direct current (DC) power source (e.g., a wind turbine, a solar array, etc.) and to provide power to the mesh network 102. The second pole 38f of the sixth ATS 10f is open and not coupled to any system component, although in some embodiments, the second pole 38f of the sixth ATS 10f is coupled to the mesh network 102, or another component. The first pole 34f of the sixth ATS 10f is coupled to the third pole 42c of the third ATS 10c so that communication between the common pole 50c of the third ATS 10c and the common pole 50f of the sixth ATS 10f is controlled by the third switching device 78c of the third ATS 10c and the first switching device 54f of the sixth ASTS 10f. The fourth pole 46f of the sixth ATS 10f is coupled to the second pole 38e of the fifth ATS 10e so that communication between the common pole 50f of the sixth ATS 10f and the common pole 50e of the fifth ATS 10e is controlled by the fourth switching device 90f of the sixth ATS 10f and the second switching device 66e of the fifth ATS 10e.

The common pole 50g of a seventh ATS 10g is coupled to a utility 130 structured to provide power to the mesh network 102. The third pole 42g and the fourth pole 46g of the seventh ATS 10g are open and not coupled to any system component, although in some embodiments, the third pole 42g and the fourth pole 46g of the seventh ATS 10g are coupled to the mesh network 102, or another component. The first pole 34g of the seventh ATS 10g is coupled to the third pole 42d of the fourth ATS 10d so that communication between the common pole 50g of the seventh ATS 10g and the common pole 50d of the fourth ATS 10d is controlled by the first switching device 54g of the seventh ATS 10g and the third switching device 78d of the fourth ATS 10d.

The common pole 50h of an eighth ATS 10h is coupled to a second generator set 134 structured to provide power into the mesh network 102. The third pole 42h of the eighth ATS 10h is open and not coupled to any system component, although in some embodiments, the third pole 42h of the eighth ATS 10h is coupled to the mesh network 102, or another component. The first pole 34h of the eighth ATS 10h is coupled to the third pole 42e of the fifth ATS 10e so that communication between the common pole 50h of the eighth ATS 10h and the common pole 50e of the fifth ATS 10e is controlled by the first switching device 54h of the eighth ATS 10h and the third switching device 78e of the fifth ATS 10e. The fourth pole 46h of the eighth ATS 10h is coupled to the second pole 38g of the seventh ATS 10g so that communication between the common pole 50h of the eighth ATS 10h and the common pole 50g of the seventh ATS 10g is controlled by the fourth switching device 90h of the eighth ATS 10h and the second switching device 66g of the seventh ATS 10g.

The common pole 50i of a ninth ATS 10i is coupled to a second inverter 138 structured to receive power from a direct current (DC) power source (e.g., a wind turbine, a solar array, etc.) and to provide power to the mesh network 102. The second pole 38i and the third pole 42i of the ninth ATS 10i are open and not coupled to any system component, although in some embodiments, the second pole 38i and the third pole 42i of the ninth ATS 10i are coupled to the mesh network 102, or another component. The first pole 34i of the ninth ATS 10i is coupled to the third pole 42f of the sixth ATS 10f so that communication between the common pole 50i of the ninth ATS 10i and the common pole 50f of the sixth ATS 10f is controlled by the first switching device 54i of the ninth ATS 10i and the third switching device 78f of the sixth ATS 10f. The fourth pole 46i of the ninth ATS 10i is coupled to the second pole 38h of the eighth ATS 10h so that communication between the common pole 50i of the ninth ATS 10i and the common pole 50h of the eighth ATS 10h is controlled by the fourth switching device 90i of the ninth ATS 10i and the second switching device 66h of the eighth ATS 10h.

Although the embodiment illustrated in FIG. 2 shows particular loads and power sources connected to the common poles 50a-i, it should be understood that the common poles 50a-i can be connected to different power sources and/or loads and the arrangement of the mesh network 102 can take on many forms. The automatic transfer switches allow the system to be expanded or contracted as desired and customized to accommodate other layouts.

A controller or control circuit 142 is arranged in communication with the nine ATSs 10a-i to control operation of the switching devices and control the flow of energy within the mesh network 102. In some embodiments, the control circuit 142 communicates with the ATSs 10a-i via a wired connection and may include individual control circuits associated with each of the ATSs 10a-i to provide individual control coordinated by a larger control system. In some embodiments, the ATS controls operate as a distributed control network without a central control.

Operation of the mesh network 102 allows individual loads or power supplies to be brought online and/or offline without interrupting service to the rest of the mesh network 102. The power sources connected to the mesh network 102 can be synchronized or otherwise run in parallel to provide a summed total power available to the connected loads. The ATSs can also route power through the mesh network to limit the total power on any leg to facilitate a smaller sized bus and ATSs to keep hardware infrastructure cost down. In this, power may be passed through the mesh network from one or more sources to a high current demanding load across multiple paths of connecting conductors and pass-through nodes. For example, in one embodiment utilizing the mesh network of FIG. 2, to increase current carrying capacity power can be passed from the Utility 130 coupled to ATS node 10g to the Load 106 coupled to ATS node 10a by way of ATS 10d and intervening conductors, and, in parallel, via ATS nodes 10h, 10e, and 10b. Alternately, power may be routed from two separate sources to a load, for example, from Generator 118 on ATS node 10d, and Battery Bank 114 on ATS node 10c through ATS node 10b to Load 106 coupled to ATS node 10a. In other embodiments, shorted, open, or other wise faulty conductors or ATS nodes can be isolated and routed around to allow the mesh network to continue to operate in the presence of the fault. Faulty conductors can be isolated by opening the ATS node source pole contacts coupled to the conductor, where faulted ATS nodes or their coupled source/load can be isolated by opening all the source contact switches on the faulted ATS node itself, or by opening the source pole contact switches on the ATS nodes coupled "on the periphery" to the conductors running to the faulted ATS node. It is noted that a faulted load or source may also be isolated by opening the circuit breaker (if used) that couples it to its associated ATS node, allowing the ATS node to continue to be used to pass current through itself and route power in the mesh power network 102. It is also noted that sub-networks can also be formed in the mesh power network 102 that are electrically isolated from each other by opening the ATS source pole contactors along one or more selected boundaries in the mesh network, for example opening one or more of the source pole contactors coupling to the conductors connecting ATS nodes 10b and 10c, 10e and 10f, and 10i and 10f to isolate ATS nodes 10c and 10f, while closing the source node contactors coupling ATS 10c and 10f, so that inverter 126 and battery bank 114 form an isolated sub-network. These isolated sub-networks can then be used for differing purposes or functions, such as using inverter 126 to charge battery bank 114 separate from the main mesh network 102 or other load balancing or power routing needs. For maintenance, this sub-networking or single ATS node isolation (by opening of all of its source pole contactors) can be used to isolate the sub-network or ATS node for maintenance.

Although nine ATS 10a-I are shown in FIG. 2 it is contemplated that the mesh network 102 can include less than nine ATSs or more than nine ATSs, as desired. The scalability of the mesh network 102 is unlimited and can be expanded or retracted to suit the needs of individual installations. The mesh network 102 provides redundancy within a micro-power grid. When used in the mesh network 102, the ATSs 10a-i are sized to accommodate the bus power needs (e.g., the power transmission between the sum total of power sources and loads). The elegant solution of creating a microgrid or mesh network 102 with four-way automatic transfer switches provides a high level of reliability while reducing the number of components necessary to achieve stable functionality. Additionally, the use of the four-way automatic transfer switches reduces the footprint or space claim of the system when compared with other switching systems. Further, the reduction of complexity of the system by the use of four-way automatic transfer switches decreases installation errors and cost associated with large cable runs and labor for installation.

In some embodiments, loads, power sources, and/or other components may be arranged between ATSs 10a-i where desired.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1 and 2, it should be understood that the ATS 10 and the mesh network 102 may include any number of circuits for completing the functions described herein. For example, the activities and functionalities of the control circuit 142 and mesh network 102 may be combined in multiple circuits or as a single circuit. Additional circuits with additional functionality may also be included. Further, the control circuit 142 may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A mesh network for power distribution, comprising:
a plurality of interconnected four-way automatic transfer switches, each four-way automatic transfer switch including
a common pole,
a first pole selectively coupled to the common pole with a first switching device,
a second pole selectively coupled to the common pole with a second switching device,
a third pole selectively coupled to the common pole with a third switching device, and
a fourth pole selectively coupled to the common pole with a fourth switching device,
wherein the common pole of a first interconnected four-way automatic transfer switch of the plurality of interconnected four-way automatic transfer switches is structured to provide power to corresponding loads,
wherein the common poles of two or more second interconnected four-way automatic transfer switches of the plurality of interconnected four-way automatic transfer switches are structured to receive power from corresponding power sources, and
wherein the common pole of a second four-way automatic transfer switch of the plurality of interconnected four-way automatic transfer switches is structured to receive power from a first power source so that the second four-way automatic transfer switch operates in a reverse power arrangement.

2. The mesh network of claim 1, further comprising a controller in communication with each of the plurality of interconnected four-way automatic transfer switches to control actuation of the switching devices.

3. The mesh network of claim 1, wherein operation of the switching devices allows each of the common poles to be selectively connected to or isolated from the mesh network.

4. The mesh network of claim 1, wherein the common pole of the second four-way automatic transfer switch of the plurality of interconnected four-way automatic transfer switches is structured to receive power from a generator set,
wherein the common pole of a third four-way automatic transfer switch of the plurality of interconnected four-way automatic transfer switches is structured to receive power from a utility, and
wherein the common pole of a fourth four-way automatic transfer switch of the plurality of interconnected four-way automatic transfer switches is structured to provide power to a first load.

5. The mesh network of claim 1, wherein each of the first switching device, the second switching device, the third switching device, and the fourth switching device are independently actuatable between an open position and a closed position.

6. The mesh network of claim 1, wherein isolation of one common pole from the mesh network does not interrupt service within the remaining common poles of the mesh network.

7. A system, comprising:
a first four-way automatic transfer switch including a first common pole structured to be coupled to one of a load and a power source;
a second four-way automatic transfer switch interconnected with the first four-way automatic transfer switch, the second four-way automatic transfer switch including a second common pole selectively coupled to the first common pole, and structured to receive power so that the second four-way automatic transfer switch operates in a reverse power arrangement;
a third four-way automatic transfer switch including a third common pole structured to be coupled to one of a load and a power source, the third common pole selectively coupled to the second common pole;
a fourth four-way automatic transfer switch including a fourth common pole structured to be coupled to one of a load and a power source, the fourth common pole selectively coupled to the first common pole;

a fifth four-way automatic transfer switch including a fifth common pole structured to be coupled to one of a load and a power source, the fifth common pole selectively coupled to the fourth common pole and the second common pole; and a sixth four-way automatic transfer switch including a first common pole structured to be coupled to one of a load and a power source, the sixth common pole selectively coupled to the fifth common pole and the third common pole.

8. The system of claim 7, further comprising a controller in communication with each of the four-way automatic transfer switches to control actuation thereof.

9. The system of claim 7, wherein each of the four-way automatic transfer switches includes
- a first pole selectively coupled to a corresponding common pole with a first switching device,
- a second pole selectively coupled to the corresponding common pole with a second switching device,
- a third pole selectively coupled to the corresponding common pole with a third switching device, and
- a fourth pole selectively coupled to the corresponding common pole with a fourth switching device.

10. The system of claim 9, wherein operation of the switching devices allows each of the common poles to be selectively connected to or isolated from the mesh network.

11. The system of claim 9, wherein each of the first switching device, the second switching device, the third switching device, and the fourth switching device are independently actuatable between an open position and a closed position.

12. The system of claim 7, wherein isolation of one common pole from the mesh network does not interrupt service within the remaining common poles of the mesh network.

13. The system of claim 7, wherein the first four-way automatic transfer switch, the second four-way automatic transfer switch, the third four-way automatic transfer switch, the fourth four-way automatic transfer switch, the fifth four-way automatic transfer switch, and the sixth four-way automatic transfer switch are sized to accommodate a bus power demand.

14. A method of interconnecting a mesh network, comprising:

providing a plurality of automatic transfer switches, each automatic transfer switch including a common pole and a plurality of transfer poles selectively coupled to the common pole;

coupling the transfer poles together to form the mesh network;

coupling each common pole to one of a power source or a load; and providing a first sub-network of automatic transfer switches and a second sub-network of automatic transfer switches, the first sub-network of automatic transfer switches being electrically isolated from the second sub-network of automatic transfer switches via manipulation of the transfer poles.

15. The method of claim 14, further comprising opening switching devices associated with the transfer poles of a first automatic transfer switch to isolate the common pole of the first automatic transfer switch from the mesh network.

16. The method of claim 14, controlling operation of the plurality of automatic transfer switches with a controller.

17. The method of claim 14, wherein providing the plurality of automatic transfer switches includes providing nine automatic transfer switches.

18. The method of claim 14, further comprising sizing the plurality of automatic transfer switches to accommodate a bus power demand of the mesh network.

19. The method of claim 14, wherein each of the plurality of automatic transfer switches includes four transfer poles.

20. The method of claim 14, further comprising passing power through the mesh network from one or more power sources to a high current demanding load across multiple paths of connecting automatic transfer switches.

21. The method of claim 14, further comprising isolating the common pole of a first automatic transfer switch from the mesh network by opening the transfer poles of adjoining automatic transfer switches.

22. The method of claim 14, further comprising opening a circuit breaker associated with the common pole of a first automatic transfer switch while maintaining the transfer poles of the first automatic transfer switch closed so that the first automatic transfer switch remains a node in the mesh network.

* * * * *